United States Patent
Ikura et al.

(10) Patent No.: US 12,325,780 B2
(45) Date of Patent: Jun. 10, 2025

(54) ORGANIC FIBER-REINFORCED RESIN FORMED BODY AND METHOD FOR PRODUCING THE SAME

(71) Applicant: FURUKAWA ELECTRIC CO., LTD., Tokyo (JP)

(72) Inventors: Yukihiro Ikura, Tokyo (JP); Mayu Satake, Tokyo (JP); Suzune Ito, Tokyo (JP); Yasuo Nakajima, Tokyo (JP); Kenichi Suyama, Tokyo (JP); Jae Kyung Kim, Tokyo (JP); Hiroki Tanaka, Tokyo (JP); Isao Tomomatsu, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 739 days.

(21) Appl. No.: 17/483,971

(22) Filed: Sep. 24, 2021

(65) Prior Publication Data
US 2022/0025133 A1 Jan. 27, 2022

Related U.S. Application Data

(63) Continuation of application No. PCT/JP2020/013855, filed on Mar. 26, 2020.

(30) Foreign Application Priority Data

Mar. 27, 2019 (JP) .................. 2019-060606

(51) Int. Cl.
 *C08J 5/04* (2006.01)
 *B29B 7/00* (2006.01)
 (Continued)

(52) U.S. Cl.
 CPC ............... *C08J 5/045* (2013.01); *B29B 7/002* (2013.01); *B29B 7/82* (2013.01); *B29K 2023/12* (2013.01);
 (Continued)

(58) Field of Classification Search
 CPC ... C08L 23/10; C08K 7/02; C08J 5/045; C08J 2323/12; B29K 2201/00; B29K 2023/12
 See application file for complete search history.

(56) References Cited

U.S. PATENT DOCUMENTS

2007/0178324 A1* 8/2007 Masuda ................ B29C 48/917
 428/500
2012/0190775 A1 7/2012 Yasuda et al.
 (Continued)

FOREIGN PATENT DOCUMENTS

CN 103813893 A 5/2014
CN 104024316 A 9/2014
 (Continued)

OTHER PUBLICATIONS

International Search Report, issued in PCT/JP2020/013855, dated Jun. 16, 2020.
 (Continued)

*Primary Examiner* — Ling Siu Choi
*Assistant Examiner* — Olga Lucia Donahue
(74) *Attorney, Agent, or Firm* — Birch, Stewart, Kolasch & Birch, LLP

(57) ABSTRACT

An organic fiber-reinforced resin formed body that contains a resin and a cellulose fiber, wherein the resin formed body has a density of 0.65 g/cm$^3$ or less, and a method for producing the same.

13 Claims, 1 Drawing Sheet

(51) Int. Cl.
    *B29B 7/82*           (2006.01)
    *B29K 23/00*         (2006.01)
    *B29K 201/00*      (2006.01)

(52) U.S. Cl.
    CPC ....... *B29K 2201/00* (2013.01); *C08J 2323/12* (2013.01)

(56) References Cited

U.S. PATENT DOCUMENTS

| | | |
|---|---|---|
| 2014/0343196 A1 | 11/2014 | Kousaka et al. |
| 2015/0005405 A1 | 1/2015 | Ishihara et al. |
| 2016/0133902 A1 | 5/2016 | Nakamura et al. |
| 2017/0296707 A1 | 10/2017 | Joyce |
| 2018/0037704 A1 | 2/2018 | Ishiguro et al. |

FOREIGN PATENT DOCUMENTS

| | | |
|---|---|---|
| CN | 105263998 A | 1/2016 |
| CN | 107428977 A | 12/2017 |
| EP | 2 455 421 A1 | 5/2012 |
| EP | 3 006 492 A1 | 4/2016 |
| EP | 3 263 638 A1 | 1/2018 |
| JP | 2007-56176 A | 3/2007 |
| JP | 2011-208015 A | 10/2011 |
| JP | 2013-245343 A | 12/2013 |
| JP | 2014-24928 A | 2/2014 |
| JP | 5762674 B2 | 8/2015 |
| WO | WO2014/196551 A1 | 12/2014 |
| WO | WO2016/136881 A1 | 9/2016 |

OTHER PUBLICATIONS

Chinese Office Action for corresponding Chinese Application No. 202080005586.4, dated Aug. 7, 2023, with an English translation.
Chinese Office Action and Search Report for corresponding Chinese Application No. 202080005586.4, dated Mar. 1, 2023, with an English translation.
Extended European Search Report for corresponding European Application No. 20777872.1, dated Nov. 4, 2022.
Japanese Notice of Reasons for Refusal for corresponding Japanese Application No. 2021-509619, dated Dec. 19, 2023, with an English translation.

* cited by examiner

ORGANIC FIBER-REINFORCED RESIN FORMED BODY AND METHOD FOR PRODUCING THE SAME

CROSS-REFERENCE TO RELATED APPLICATIONS

This application is a Continuation of PCT International Application No. PCT/JP2020/013855 filed on Mar. 26, 2020, which claims priority under 35 U.S.C. § 119 (a) to Japanese Patent Application No. 2019-060606 filed in Japan on Mar. 27, 2019. Each of the above applications is hereby expressly incorporated by reference, in its entirely, into the present application.

TECHNICAL FIELD

The present invention relates to an organic fiber-reinforced resin formed body and a method for producing the same.

BACKGROUND ART

There has been known a fiber-reinforced resin compounding a reinforcing fiber, such as a glass fiber and an organic fiber, in a resin in order to enhance a mechanical physical property of a polyolefin resin, such as polyethylene and polypropylene. The organic fibers include cellulose fibers, for example, kraft pulp fiber, wood flour, and jute fiber. It has been known that using an organic fiber as a reinforcement material causes the obtained fiber-reinforced resin to be lighter in weight and to have a higher specific strength (value obtained by dividing a mechanical strength by a density) compared with the case of reinforcement with a glass fiber.

For example, Patent Literature 1 discloses a composite resin composition including a polypropylene resin and plant fibers having organic solvent extractable components of 1 weight % or less.

CITATION LIST

Patent Literatures

Patent Literature 1: Japanese Patent No. 5762674

SUMMARY OF INVENTION

Technical Problem

A material used in a transport equipment material and the like is requested to be lightweight (low density) and to exhibit a high mechanical strength, that is, to have a high specific strength. Recently, this request has been further increased. A property that the mechanical property can be maintained even in a case of the use under a severe condition, such as a high temperature environment, is also required.

The inventors examined conventional organic fiber-reinforced resin formed bodies including the formed body obtained from the composite resin composition disclosed in Patent Literature 1, and have found that these organic fiber-reinforced resin formed bodies do not have the specific strength sufficient to satisfy the above-described request.

An object of the present invention is to provide an organic fiber-reinforced resin formed body that is excellent in specific strength and less likely to cause a decrease in mechanical property even in a high temperature environment.

Solution to Problem

That is, the above-described problem of the present invention was solved by the following means.

{1}
An organic fiber-reinforced resin formed body that contains a resin and a cellulose fiber, wherein the resin formed body has a density of 0.65 g/cm³ or less.

{2}
The organic fiber-reinforced resin formed body according to {1}, wherein the cellulose fiber has an orientation degree of 0.40 or more.

{3}
The organic fiber-reinforced resin formed body according to {1} or {2}, wherein a linear expansion coefficient in a temperature range of 60° C. or more and 100° C. or less of the resin formed body is 0 ppm/K or more and less than 10 ppm/K.

{4}
The organic fiber-reinforced resin formed body according to any one of {1} to {3}, wherein the resin contains a polypropylene resin.

{5}
The organic fiber-reinforced resin formed body according to any one of {1} to {4}, wherein the resin has a crystal orientation degree of more than 0.50 and 1.00 or less.

{6}
The organic fiber-reinforced resin formed body according to any one of {1} to {5}, wherein a specific strength obtained by dividing a tensile strength of the resin formed body by the density of the resin formed body is 0.08 MJ/kg or more.

{7}
The organic fiber-reinforced resin formed body according to any one of {1} to {6}, wherein an elastic modulus retention ratio $E_{100}/E_{25}$, which is a ratio of a storage elastic modulus $E_{100}$ at 100° C. to a storage elastic modulus $E_{25}$ at 25° C., is 0.38 or more.

{8}
The organic fiber-reinforced resin formed body according to any one of {1} to {7}, wherein the resin formed body is formed by extending in one direction.

{9}
The organic fiber-reinforced resin formed body according to any one of {1} to {8}, wherein the density is 0.40 g/cm³ or more, the orientation degree of the cellulose fiber is 0.40 or more, and the crystal orientation degree of the resin is 0.65 or more and 1.00 or less.

{10}
A method for producing the organic fiber-reinforced resin formed body according to {1} to {9}, having a step of maintaining an intermediate formed body obtained from a melt-kneaded product of a resin and a cellulose fiber at a temperature of a crystal relaxation temperature or more and a melting point or less of the resin and at least uniaxially extending the intermediate formed body.

In the description of the present invention, "to" is used to mean that values described before and after "to" are included as the lower limit value and the upper limit value.

Effects of Invention

The organic fiber-reinforced resin formed body of the present invention is excellent in specific strength and less likely to cause a decrease in mechanical property even in a high temperature environment.

DESCRIPTION OF EMBODIMENTS

{Resin Formed Body}

Figure 1:
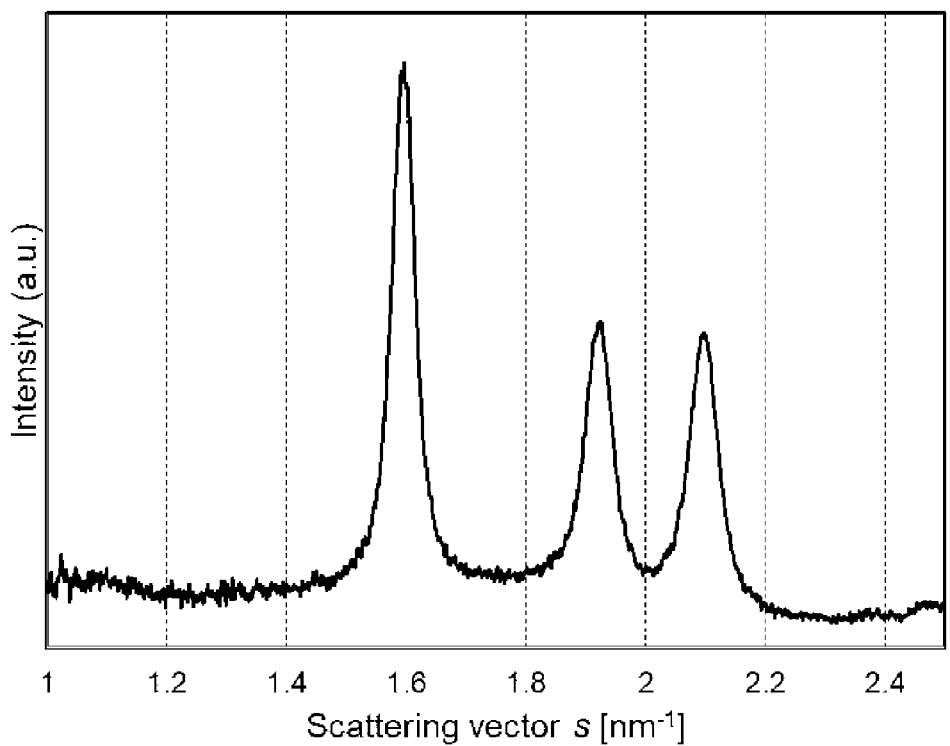
FIG. 1 is a one-dimensional diffraction pattern of a wide-angle X-ray diffraction measurement of a cellulose fiber-reinforced polypropylene resin formed body according to Example 1. A diffraction peak observed at a position of a scattering vector s of 1.60 nm$^{-1}$ is a diffraction peak derived from a polypropylene α-crystal (040) plane, and a diffraction peak observed at a position of the scattering vector s of 1.92 nm$^{-1}$ is a diffraction peak derived from a polypropylene α-crystal (110) plane. Note that a diffraction peak observed at a position of the scattering vector s of 2.10 nm$^{-1}$ is a diffraction peak derived from a polypropylene α-crystal (130) plane.

An organic fiber-reinforced resin formed body (hereinafter also referred to as simply a "resin formed body") of the present invention contains a resin and a cellulose fiber, and a density of the resin formed body is 0.65 g/cm$^3$ or less. This resin formed body is excellent in specific strength and less likely to cause a decrease in elastic modulus even in a high temperature environment.

The resin preferably contains a thermoplastic resin, more preferably contains a polyolefin resin (a resin obtained by polymerizing or copolymerizing an ethylenically unsaturated compound. While details will be described below, for example, a polyethylene resin and a polypropylene resin), and further preferably contains a polypropylene resin. Details of the resin usable in the present invention will be described later.

In the resin formed body, at least a part of the resin preferably forms a crystalline structure. For example, when the polypropylene resin is contained as the resin, at least a part of the polypropylene resin preferably forms the crystalline structure, and preferably has an α type crystal (hereinafter also referred to as an α-crystal).

In the resin formed body, the cellulose fiber is preferably oriented. In the resin formed body, the resin is also preferably oriented. An orientation degree of the cellulose fiber and an orientation degree of the resin will be described later.

The resin formed body is preferably a resin formed body extended in one direction. The extending method will be described later.

The following describes components of the resin formed body of the present invention.

(Cellulose Fiber)

The cellulose fiber for use in the present invention is a fibrous cellulose.

One type or two or more types of cellulose fibers may be included in the resin formed body of the present invention.

Derivations of the above-described cellulose fibers are not specifically limited and specific examples thereof include cellulose fibers obtained using, for example, wood, bamboo, hemp, jute, kenaf, agricultural product remains or wastes (for example, straw of wheat or rice plant, corn, stalks of cotton, and sugar cane), cloth, regenerated pulp, and waste paper as a raw material. The pulp is also a raw material for paper and consists primarily of a tracheid which is extracted from a plant. From a chemical viewpoint, a primary constituent of the pulp is a polysaccharide and its primary constituent is cellulose. As the cellulose fiber for use in the present invention, the cellulose fiber derived from wood is particularly preferred.

The above-described cellulose fibers are not specifically limited and the cellulose fiber obtained by any desired production method can be used. For example, specific examples thereof include cellulose fibers obtained by mechanical processing that performs a grinding process with a physical force, or by chemical processing, such as the kraft pulp method, the sulfide pulp method, and the alkaline pulp process, or by combined use of such processings. In the above-described chemical processing, using a chemical, such as a caustic soda, and the like, lignin, hemicellulose, and the like can be removed from a plant material, such as wood, to extract almost pure cellulose fiber. The cellulose fiber thus obtained is also referred to as a pulp fiber.

From the point of improving the mechanical property such as the specific strength and the elastic modulus in high temperature environment, the cellulose fiber used in the present invention is preferably a cellulose fiber prepared by chemical processing, and more preferably a cellulose fiber prepared by a kraft pulp method. Especially, when the polypropylene resin is used as the resin, it is preferable to use a cellulose fiber subjected to the chemical processing. In the case of the cellulose fiber subjected to the chemical processing, lignin or the like does not remain in the cellulose fiber, thus contributing to the improvement of the mechanical property of the resin formed body. One of the causes of this is considered that an interaction between the polypropylene resin and the cellulose fiber on an interface therebetween is not hindered by lignin.

The cellulose fiber for use in the present invention has a diameter of preferably 1 to 30 μm, more preferably 1 to 25 μm, and further preferably 5 to 20 μm. The length (fiber length) of the cellulose fiber is preferably 10 to 2200 μm, and more preferably 50 to 1000 μm.

The diameter of the cellulose fiber contained in the formed body of the present invention can be measured by a scanning electron microscope (SEM) and a fiber analyzer. The fiber length of the cellulose fiber also can be measured by the SEM observation. In the measurement of the fiber length by the SEM observation, a residue after eluting a resin (e.g. polypropylene resin) in a resin formed body of the present invention by using a hot xylene is placed on a stage, and processing, such as vapor deposition, is performed, thus allowing measurement of the fiber length by the SEM observation.

From the aspect of enhancing the mechanical strength, an aspect ratio of the cellulose fiber (fiber length L/fiber diameter D) is preferably 5 to 100, and more preferably 10 to 50.

The content of the cellulose fiber in the resin formed body of the present invention is preferably 1 to 40 mass parts, and especially preferably 5 to 30 mass parts, in 100 mass parts of the total amount of the resin and the cellulose fiber.

(Resin)

The resin used in the present invention is preferably a thermoplastic resin.

The thermoplastic resin includes, in addition to the polyolefin resin, a thermoplastic resin such as a polyvinyl chloride resin, an acrylonitrile-butadiene-styrene copolymer resin (ABS resin), an acrylonitrile-styrene copolymer resin (AS resin), a polyethylene terephthalate resin, a polybutylene terephthalate resin, a polystyrene resin, and a polyamide resin.

The thermoplastic resin may contain a modified resin together with an unmodified resin. For example, it is also preferable to contain a resin (acid modified resin) modified by an unsaturated carboxylic acid or its derivative.

The polyolefin resin is not specifically limited insofar as the polyolefin resin is a resin containing a polymer obtained by polymerizing or copolymerizing a compound having an ethylenically unsaturated bond (usually, alkene).

The polyolefin resin includes, for example, a polyethylene resin, a polypropylene resin, an ethylene-α-olefin copolymer resin, and a polyolefin copolymer resin containing an acid copolymerization component or an acid ester copolymerization component.

It is preferable that the thermoplastic resin contains a polyolefin resin, and more preferable that the thermoplastic resin is a polyolefin resin. Especially, from the aspect of heat resistance and strength of the formed product, it is preferred that the thermoplastic resin contains a polypropylene resin, and it is more preferred that the thermoplastic resin is a polypropylene resin. The polypropylene resin may be an unmodified one or a modified product, and it is preferred to contain the unmodified polypropylene resin. It is also preferred that the polypropylene resin contains an acid modified polypropylene resin together with the unmodified polypropylene resin.

The resin content in the resin formed body of the present invention is preferably 40 to 95 mass parts in the sum amount of 100 mass parts of the resin and the cellulose fiber, and especially, when the resin contains the polypropylene resin, it is preferable to contain the polypropylene resin of 50 to 100 mass % in the resin of 100 mass %, and it is more preferable to contain the polypropylene resin of 60 to 90 mass %.

In the present invention, the resin formed body using the polypropylene resin as the resin is referred to as a cellulose fiber-reinforced polypropylene resin formed body in some cases.

—Polypropylene Resin—

The polypropylene resin for use in the present invention is not specifically limited, and for example, any of homopolypropylene, polypropylene block copolymer, or polypropylene random copolymer can be used.

Specific examples of polypropylene in the polypropylene resin include a propylene homopolymer, a propylene-ethylene random copolymer, a propylene-α-olefin random copolymer, a propylene-ethylene-α-olefin copolymer, and a propylene block copolymer (copolymer that contains a propylene homopolymer component or copolymer component that mainly contains propylene, and a copolymer component obtained by copolymerizing at least one monomer selected from ethylene and α-olefin with propylene). These polypropylene resins may be used singly or two or more kinds thereof may be used in combination.

As α-olefin for use in a polypropylene resin, 1-butene, 1-pentene, 1-hexene, 4-methyl-1-pentene, 1-octene, and 1-decene are preferable, and 1-butene, 1-hexene, and 1-octene are more preferable.

Specific examples of the propylene-α-olefin random copolymer include a propylene-1-butene random copolymer, a propylene-1-hexene random copolymer, a propylene-1-octene random copolymer, and the like.

Specific examples of propylene-ethylene-α-olefin copolymer include a propylene-ethylene-1-butene copolymer, a propylene-ethylene-1-hexene copolymer, a propylene-ethylene-1-octene copolymer, and the like.

Specific examples of the propylene block copolymer include a (propylene)-(propylene-ethylene) copolymer, a (propylene)-(propylene-ethylene-1-butene) copolymer, a (propylene)-(propylene-ethylene-1-hexene) copolymer, a (propylene)-(propylene-1-butene) copolymer, a (propylene)-(propylene-1-hexene) copolymer, a (propylene-ethylene)-(propylene-ethylene) copolymer, a (propylene-ethylene)-(propylene-ethylene-1-butene) copolymer, a (propylene-ethylene)-(propylene-ethylene-1-hexene) copolymer, a (propylene-ethylene)-(propylene-1-butene) copolymer, a (propylene-ethylene)-(propylene-1-hexene) copolymer, a (propylene-1-butene)-(propylene-ethylene) copolymer, a (propylene-1-butene)-(propylene-ethylene-1-butene) copolymer, a (propylene-1-butene)-(propylene-ethylene-1-hexene) copolymer, a (propylene-1-butene)-(propylene-1-butene) copolymer, a (propylene-1-butene)-(propylene-1-hexene) copolymer, and the like.

Among these polypropylene resins, homo-polypropylene, propylene-ethylene-1-octene copolymer, or polypropylene block copolymer is preferable from the aspect of a tensile strength and an impact resistance.

The fluidity of the polypropylene resin is also not limited, and a polypropylene resin having appropriate fluidity in consideration of the thickness, the volume, or the like of the formed body can be used.

One polypropylene resin may be used alone, or two or more may be mixed for use.

The content of the polypropylene resin in the resin formed body of the present invention is preferably 60 to 99 mass parts, more preferably 70 to 95 mass parts, and particularly preferably 75 to 85 mass parts, in 100 mass parts of the total amount of the polypropylene resin and the cellulose fiber.

A part of the polypropylene resin contained in the resin formed body of the present invention is preferably a polypropylene resin modified with acid (hereinafter also referred to as an "acid modified polypropylene resin").

It is considered that when the resin formed body of the present invention contains the acid modified polypropylene resin as a part of the polypropylene resin, an effect of improving adhesiveness between the polypropylene resin not modified with acid and the cellulose fiber by the acid modified polypropylene resin is obtained, in addition, the orientation degree of the cellulose fiber can be effectively increased, and consequently, the mechanical property such as the elastic modulus can be effectively enhanced even in the high temperature environment.

The acid modified polypropylene resin includes the one obtained by modifying the above-described polypropylene resin with, for example, unsaturated carboxylic acid or its derivative. The unsaturated carboxylic acid includes, for example, maleic acid, fumaric acid, itaconic acid, acrylic acid, and methacrylic acid, and the unsaturated carboxylic acid derivative includes, for example, maleic anhydride, itaconic acid anhydride, methyl acrylate, ethyl acrylate, butyl acrylate, glycidyl acrylate, methyl methacrylate, ethyl methacrylate, butyl methacrylate, glycidyl methacrylate, maleic acid monoethyl ester, maleic acid diethyl ester, fumaric acid monomethyl ester, and fumaric acid dimethyl ester.

As the acid modified polypropylene resin, it is preferable to contain maleic acid modified polypropylene and/or maleic anhydride modified polypropylene.

When the resin formed body of the present invention contains the acid modified polypropylene resin, the content of the acid modified polypropylene resin in the resin formed body of the present invention is preferably 0.3 to 20 mass parts, preferably 1 to 15 mass parts, and more preferably 3 to 7 mass parts in the sum amount of 100 mass parts of the polypropylene resin (sum of the polypropylene resin not modified with acid and the acid modified polypropylene resin) and the cellulose fiber. By setting the content of the acid modified polypropylene resin to the above-described range, for example, the resin formed body of the present invention can be led to the mechanical property exhibiting a high elastic modulus at high temperature.

(Other Components)

The resin formed body of the present invention may have a configuration containing the resin and the cellulose fiber as described above, and a rubber, an elastomer, and the like also may be used together. For example, a hydrogenated styrene elastomer or an elastomer of a styrene-ethylene-butadiene-styrene copolymer (SEBS), a styrene-ethylene butylene-olefin crystal block copolymer (SEBC), an ethylene-α-olefin copolymer, or the like may be additionally combined to modify the physical property of the resin formed body. Into the resin formed body of the present invention, other additives can be appropriately incorporated in the range in which the above-described purpose is not adversely affected, such as an antioxidant, a light stabilizer, a radical scavenger, an ultraviolet absorber, a colorant (dye, organic pigment, inorganic pigment), a filler, a slipping agent, a plasticizer, a processing aid such as an acrylic processing aid, a foaming agent, a lubricant such as paraffin wax, a surface treatment agent, a nucleating agent, a releasing agent, a hydrolysis inhibitor, an anti-blocking agent, an antistatic agent, an anticlouding agent, a fungicidal agent, an ion trapping agent, a flame retardant, and a flame retardant aid.

(Crystalline Structure of Resin and its Orientation Degree)

In the resin formed body, at least a part of the resin preferably forms the crystalline structure. When the resin formed body contains a plurality of kinds of resin, any of the plurality of resins preferably forms the crystalline structure.

Furthermore, the crystalline structure of the resin is preferably oriented. When the resin formed body contains a plurality of kinds of resin, it is only necessary that the crystalline structure of any of the plurality of resins is oriented.

The orientation degree of the crystalline structure of the resin (crystal orientation degree) is preferably more than 0.50 and 1.00 or less. By setting the crystal orientation degree of the resin to the above-described range, the specific strength can be more enhanced, and the mechanical property such as the elastic modulus can be more enhanced even in the high temperature environment.

It is considered that, in the resin formed body of the present invention, for example, by performing stretching in a predetermined temperature range as described later, the crystalline structure of the resin is easily oriented in an extending direction, and the resin formed body can exhibit the high crystal orientation degree.

In contrast, in a conventional foam type cellulose fiber-reinforced resin formed body with low density, the orientation of the resin is low, the orientation degree is usually 0.50 or less, and the improvement of the mechanical property such as the specific strength and the elastic modulus in high temperature environment is restricted.

In also considering the improvement of the mechanical property in the crystal orientation direction of the resin, the crystal orientation degree of the resin is more preferably 0.60 to 0.98, and further preferably 0.90 to 0.98.

The crystalline structure of the resin and its orientation degree can be confirmed by an X-ray diffraction measurement.

The following describes the preferred crystal orientation degree and its measuring method in the case where the resin is the polypropylene resin.

(Crystalline Structure of Polypropylene)

It has been known that polypropylene mainly adopts a crystalline structure referred to as an α-crystal. The α-crystal is a monoclinic crystal.

In a preferred aspect of the resin formed body of the present invention, the diffraction peaks at the positions of the scattering vector s of $1.61\pm0.1$ $nm^{-1}$ and $1.92\pm0.1$ $nm^{-1}$ are observed in the wide-angle X-ray diffraction measurement. That is, in a preferred aspect of the resin formed body of the present invention, at least a part of the polypropylene has the crystalline structure, and at least a part of it is the α-crystal. The crystalline structure other than the α-crystal, occupied in the crystalline structure of the polypropylene is not specifically limited, but, for example, the β-crystal is preferred.

—Method for Confirming α-Crystal—

The X-ray diffraction measurement can be used for confirming the presence of the α-crystal. The wide-angle X-ray diffraction measurement is preferably used. In a case of a common extended formed body, intensity distribution occurs in an azimuthal direction derived from resin orientation in some cases. Therefore, since a one-dimensional scintillation counter fails to accurately capture the intensity distribution derived from orientation in some cases, a two-dimensional detector is preferably used as the detector. CuKα ray is preferably used as an X-ray source, and the shape for use is preferably a pinhole. The beam diameter of the X-ray is preferably 5 μm to 1500 μm, and more preferably 7 μm to 1000 μm. The beam diameter larger than 1500 μm cannot obtain a sufficient position resolution, and is not suitable for detailed analysis in some cases. In a case of less than 5 μm, the irradiation intensity is not sufficient due to the small beam diameter, and the measurement time is significantly lengthened, thus decreasing the measurement efficiency in some cases.

Specifically, it can be performed by a method described in the example section.

The existence of the polypropylene α-crystal also can be confirmed as follows. For example, when the wide-angle X-ray diffraction measurement is performed on a resin formed body that contains a cellulose fiber and a polypropylene resin in which an α-crystal is formed, the diffraction peak is observed at each position of the diffraction angle 2θ of $14.3\pm0.2°$, $17.1\pm0.2°$, and $34.6\pm0.2°$. Since the diffraction peaks at the positions of the diffraction angle 2θ of $14.3\pm0.2°$ and $17.1\pm0.2°$ are the diffraction peaks derived from a (040) plane of the α type crystal of the polypropylene, it can be determined that the α-crystal is formed when any of these diffraction peaks is observed.

(Crystal Orientation Degree of Polypropylene Resin)

The orientation degree of the crystal of the polypropylene resin (component having the diffraction peak at the position of the scattering vector s of $1.92\pm0.1$ $nm^{-1}$) is preferably 0.60 or more. By setting the orientation degree of the polypropylene crystal to 0.60 or more, the mechanical property such as the specific strength and the elastic modulus in high temperature environment can be more enhanced. It is considered that, in the resin formed body of the present invention, for example, by performing stretching in a predetermined temperature range as described later, the polypropylene crystal is easily oriented in an extending direction, and the resin formed body can exhibit the high crystal orientation degree.

In also considering the improvement of the mechanical property in the direction along the arrangement (oriented direction) of the polypropylene crystal, the orientation degree of the polypropylene crystal is more preferably 0.60 to 1.00, further preferably 0.65 to 0.97, and especially preferably 0.90 to 0.95.

—Method for Measuring Crystal (α-Crystal) Orientation Degree of Polypropylene Resin—

The crystal orientation degree of the polypropylene resin can be obtained by analyzing profiles in an azimuthal direction of diffraction intensities derived from the polypropylene (040) plane (diffraction is measured at the scattering vector of $1.92\pm0.1$ nm$^{-1}$) based on the two-dimensional diffraction image of the X-ray obtained according to the above-described confirmation method of polypropylene α-crystal. The analysis method includes a method for analysis using a half-value width of the diffraction peak in the azimuthal direction, and a method for obtaining using an orientation function. For the confirmation of the orientation degree of the polypropylene crystal, the sample may be cut out to be devised so as to obtain a satisfactory diffraction image. More specifically, for example, it is included that the sample is cut out at any given position for the purpose of adjusting absorption of the X-ray by the sample, thereby adjusting the thickness to approximately 0.2 to 1 mm.

—Detailed Method for Calculating Crystal Orientation Degree of Polypropylene Resin—

The X-ray diffraction pattern derived from the α type crystal (040) plane of the polypropylene crystal is used to determine the crystal orientation degree of the polypropylene resin. The two-dimensional diffraction pattern of the polypropylene crystal is one-dimensionalized into data of azimuth angle versus intensity. For one-dimensionalizing the two-dimensional data, one-dimensionalization is performed in a range of $\pm 0.5°$ centered on the diffraction 17.1° of the polypropylene α type crystal (040) plane of the polypropylene α type crystal. Since the diffraction peak derived from the polypropylene resin amorphous is also present nearby, in order to eliminate its influence, the one-dimensionalization can be performed in ranges of $\pm 0.5°$ centered on 16.1° and it is possible to subtract it from the one-dimensional diffraction intensity of the polypropylene α type crystal. While the orientation degree is determined for the corrected data of the azimuth angle diffraction intensity of the polypropylene α type crystal, any of a half-value width method that uses the half-value width for calculation or an orientation function method using the orientation function may be used for the determination of the orientation degree. When obtaining the orientation function or the half-value width, the analysis may be performed using a function obtained in the peak separation, in order to reduce a noise of data obtained by using a method, such as a peak separation of diffraction intensity in the azimuthal direction. An operation of the above-described intensity correction or the like may be performed together with this operation. The function used for the peak separation and the fitting is preferably a Gaussian function or a Lorentz function, and more preferably a Lorentz function.

—Method for Determining Presence of Cellulose Fiber—

It has been known that cellulose of a cellulose fiber adopts various crystalline structures, such as a type I and a type II. Natural cellulose has a crystalline structure of a type $I_\alpha$ (triclinic crystal) and a type $I_\beta$ (monoclinic crystal), and plant-derived cellulose generally contains a lot of type $I_\beta$ crystals.

The resin formed body of the present invention has the diffraction peak at the position of the scattering vector s of $3.86\pm0.1$ nm$^{-1}$ in the wide-angle X-ray diffraction measurement. This diffraction peak is derived from a (004) plane of the $I_\beta$ type crystal of the cellulose. That is, in the resin formed body of the present invention, at least a part of the cellulose of the cellulose fiber has the crystalline structures, and at least a part of them is the $I_\beta$ type crystal. The crystalline structures other than the $I_\beta$ type crystal in the crystalline structures of the cellulose are not specifically limited. Hereinafter, the cellulose fiber is referred to as a "component having the diffraction peak at the position of the scattering vectors of $3.86\pm0.1$ nm$^{-1}$" in some cases.

Containing the cellulose fiber can be confirmed by various methods. For example, it can be confirmed by observing the diffraction peak derived from cellulose crystal in the cellulose fiber using the X-ray. While it is necessary to be careful because the diffraction peak position differs depending on the wavelength of the X-ray used, the diffraction peak derived from the (004) plane of the $I_\beta$ type crystal of the cellulose can be observed in the proximity of the scattering vector s of 3.86 nm$^{-1}$ (2θ=34.6°) when the CuKα ray (λ=0.15418 nm) is used. For capturing the diffraction of the (004) plane, the X-ray needs to be incident on a sample that is rotated by a degree of θ. That is, when the CuKα ray is used, a sample stage is to be rotated by θ=17.3°. For the diffraction peak derived from the cellulose crystal, while other diffraction peaks can be observed inside the (004) plane, since their diffraction positions overlap with that of a diffraction peak derived from polypropylene when the resin component contains the polypropylene resin, it is not allowed to determine them as definite diffraction peaks in some cases. In view of this, in this description, the presence/absence of the cellulose fiber is determined using the diffraction peak of the $I_\beta$ type crystal (004) plane of the cellulose.

(Orientation Degree of Cellulose Fiber)

The orientation degree of the cellulose fiber (component having the diffraction peak at the position of the scattering vector s of $3.86\pm0.1$ nm$^{-1}$) is preferably 0.40 or more. By setting the orientation degree of the cellulose fiber to 0.40 or more, the mechanical property such as the specific strength and the elastic modulus in high temperature environment can be more enhanced.

Furthermore, in the configuration in which the polypropylene resin is used as the resin and at least a part of the polypropylene resin forms the α-crystal, which is a preferred aspect of the present invention, it is considered that the mechanical property such as the specific strength and the elastic modulus in high temperature environment can be more enhanced as follows.

That is, such a resin formed body has the diffraction peak derived from the polypropylene α type crystal and the diffraction peak derived from the cellulose $I_\beta$ type crystal, and both the crystal orientation degree of the polypropylene resin and the crystal orientation degree of the cellulose fiber are increased. Therefore, it is considered that the effect of improving the interaction between the cellulose fibers, and further, the interaction on the interface between the polypropylene resin and the cellulose fiber is obtained, thus effectively enhancing the mechanical property such as a tensile strength. Moreover, since the resin formed body of the present invention has the low density, the excellent specific strength is obtained. In the resin formed body of the present invention, for example, by performing stretching in a predetermined temperature range as described later, the crystal orientation degree of the polypropylene resin can be effectively increased, and the orientation degree of the cellulose fiber by the orientation of the $I_\beta$ type crystal of the cellulose fiber also can be sufficiently increased.

In contrast, in a conventional foam type cellulose fiber-reinforced resin formed body with low density, the orientation of the cellulose fiber is low, the orientation degree is usually less than 0.40, and the improvement of the mechanical property such as the specific strength and the elastic modulus in high temperature environment is restricted. Meanwhile, also in a resin formed body by an injection molding, when the stretching process or the like is not performed after the injection molding, the orientation degree of the cellulose fiber is usually less than 0.40, and the improvement of the mechanical property such as the specific strength and the elastic modulus in high temperature environment is restricted.

In considering the improvement of the mechanical property in the direction along the arrangement (oriented direction) of the cellulose fiber, the orientation degree of the cellulose fiber is more preferably 0.40 to 1.00, and further preferably 0.50 to 0.95.

—Method for Measuring Orientation Degree of Cellulose Fiber—

The orientation degree of the cellulose fiber can be obtained by analyzing profiles in an azimuthal direction of diffraction intensities derived from the cellulose (004) plane based on the two-dimensional diffraction image of the X-ray obtained according to the above-described confirmation method of containing the cellulose fiber. The analysis method includes a method for analysis using a half-value width of the diffraction peak in the azimuthal direction, and a method for obtaining using an orientation function. For the confirmation of the orientation degree of the cellulose fiber, the sample may be cut out to be devised so as to obtain a satisfactory diffraction image. More specifically, for example, it is included that the sample is cut out at any given position for the purpose of adjusting absorption of the X-ray by the sample, thereby adjusting the thickness to approximately 0.2 to 1 mm.

—Detailed Method for Calculating Orientation Degree of Cellulose Fiber—

The X-ray diffraction pattern derived from the $I_\beta$ type crystal (004) plane of the cellulose of the cellulose fiber is used to determine the orientation degree of the cellulose fiber. The two-dimensional diffraction pattern of the $I_\beta$ type crystal (004) plane of the cellulose of the cellulose fiber is one-dimensionalized into data of azimuth angle versus intensity. For one-dimensionalizing the two-dimensional data, one-dimensionalization is performed in a range of ±0.5° centered on 34.6° of the $I_\beta$ type crystal (004) plane of the cellulose of the cellulose fiber. Since the diffraction peak derived from the polypropylene resin is also present nearby, in order to eliminate its influence, the one-dimensionalization can be performed in ranges of ±0.5° centered on 33.6° and 35.6°, and an average value of them can be subtracted from the one-dimensional diffraction intensity of the $I_\beta$ type crystal of the cellulose of the cellulose fiber. While the orientation degree is determined for the corrected data of the azimuth angle diffraction intensity of the $I_\beta$ type crystal of the cellulose of the cellulose fiber, any of a half-value width method that uses the half-value width for calculation or an orientation function method using the orientation function may be used for the determination of the orientation degree. When obtaining the orientation function or the half-value width, the analysis may be performed using a function obtained in the peak separation, in order to reduce a noise of data obtained by using a method, such as a peak separation of diffraction intensity in the azimuthal direction. An operation of the above-described intensity correction or the like may be performed together with this operation. The function used for the peak separation and the fitting is preferably a Gaussian function or a Lorentz function, and more preferably a Lorentz function.

(Specific Strength)

While the specific strength, using a tensile strength as an index, of the resin formed body of the present invention depends on the type, content, and the like of the resin and cellulose fiber to be used and cannot be unambiguously set, the specific strength is preferably 0.08 MJ/kg or more, more preferably 0.16 MJ/kg or more, and further preferably 0.17 MJ/kg or more. The specific strength is calculated from the tensile strength {MPa} and the density {g/cm³} measured by the method described later and using a formula below.

$$\text{Specific strength \{MJ/kg\}} = (\text{tensile strength \{MPa\}}/\text{density \{g/cm}^3\})/10^3$$

While the upper limit value of the specific strength is not specifically limited, 0.50 MJ/kg or less is practical.

The specific strength of the resin formed body of the present invention having the value in the above-described range can be lightweight and can exhibit the high tensile strength, thus allowing the appropriate use as, for example, a material for transport equipment described later.

(Tensile Strength)

While the tensile strength of the resin formed body of the present invention depends on the type, content, and the like of the resin and cellulose fiber to be used and cannot be unambiguously set, the tensile strength is preferably 50 MPa or more and 1000 MPa or less, and more preferably 70 MPa or more and 1000 MPa or less. The tensile strength can be measured by the method under the condition described in the Examples and compliant to Japanese Industrial Standard JIS K7161. When a sample is small, a sample width or a length between chucks can be adjusted as necessary.

The tensile strength of the fiber-reinforced resin formed body usually has different values depending on the measurement direction. Therefore, in the present invention, the tensile strength and the specific strength mean the measurement value of the tensile strength in a direction in which the resin formed body has the maximum tensile strength, and the specific strength using this measurement value.

(Density)

The density of the resin formed body of the present invention is 0.65 g/cm³ or less. The density can be measured by the method under the condition described in the Examples and compliant to JIS K7112 method A (underwater substitution).

Because of the light weight with the density of 0.65 g/cm³ or less, and additionally, the high orientation degree of the resin and/or the cellulose fiber as described above, it is considered that the resin formed body of the present invention can exhibit the high tensile strength, and consequently, can exhibit the excellent specific strength. The density of the resin formed body is preferably 0.60 g/cm³ or less.

While the lower limit value of the density is not specifically limited, 0.20 g/cm³ or more is practical, and the lower limit value of the density is preferably 0.40 g/cm³ or more, and more preferably 0.55 g/cm³ or more.

(Linear Expansion Coefficient)

While the linear expansion coefficient at 60° C. or more and 100° C. or less (hereinafter simply referred to as a linear expansion coefficient) of the resin formed body depends on the type, content, and the like of the resin and cellulose fiber to be used and cannot be unambiguously set, the linear expansion coefficient is preferably 0 ppm/K (Kelvin) or more and less than 10 ppm/K, and more preferably 0 ppm/K or more and less than 5 ppm/K. The resin formed body having the above-described linear expansion coefficient is preferred in the point that the change of dimension in one direction in the high temperature region is suppressed.

The linear expansion coefficient means a mean coefficient of linear expansion, can be measured by Thermomechanical Analysis (TMA), and specifically, can be measured by the method described in the Examples.

The linear expansion coefficient of the resin formed body usually has different values depending on the measurement direction. Therefore, in the present invention, the linear expansion coefficient means the measurement value of the linear expansion coefficient in a direction in which the resin formed body has the minimum linear expansion coefficient. The direction exhibiting the minimum linear expansion coefficient usually matches the orientation direction or the extending direction of the cellulose fiber.

(Dynamic Viscoelasticity Measurement)

The dynamic viscoelasticity measurement can be performed by the method under the condition described in the embodiments compliant to JIS K7244.

(Elastic Modulus Retention Ratio)

The elastic modulus retention ratio can be obtained by reading a storage elastic modulus $E_{25}$ at 25° C. and a storage elastic modulus $E_{100}$ at 100° C. using a curve obtained from the dynamic viscoelasticity measurement, and dividing $E_{100}$ by $E_{25}$ ($E_{100}/E_{25}$).

The lower limit value of the elastic modulus retention ratio is preferably 0.38 or more, more preferably 0.40 or more, and further preferably 0.45 or more. With the preferred lower limit value or more, the elastic modulus is maintained even in the high temperature environment, and consequently, deformation is less likely to occur even in the high temperature environment, thus allowing suppressing the deformation of the resin formed body of the present invention during the use.

The upper limit value of the elastic modulus retention ratio is preferably 0.90 or less, more preferably 0.80 or less, and further preferably 0.70 or less. With the preferred upper limit value or less, the appropriate deformation can be made by heating, and occurrence of cracking in secondary processing can be suppressed in the case of a thermoforming or the like of the resin formed body of the present invention, thus allowing providing the sufficient workability.

From the aspect of suppressing the decrease in elastic modulus in the high temperature environment, it is preferred that the orientation degree of the cellulose fiber and the crystal orientation degree of the resin are each increased to become in the above-described ranges.

When the polypropylene resin is used as the resin, it is preferred that the density is 0.40 g/cm³ or more, the orientation degree of the cellulose fiber is 0.40 or more, and the crystal orientation degree of the resin is 0.65 or more and 1.00 or less. The resin formed body that satisfies these has the high elastic modulus retention ratio of 0.38 or more while having the specific strength increased to 0.08 MJ/kg or more. Furthermore, the linear expansion coefficient can be also decreased to 0 ppm/K or more and less than 10 ppm/K.

{Production of Resin Formed Body}

The method for producing the resin formed body of the present invention preferably includes at least a step of extending an intermediate formed body obtained from a melt-kneaded product of the resin and the cellulose fiber, in a predetermined temperature range.

Here, the intermediate formed body means a formed body obtained by forming the melt-kneaded product into a rod shape, a fiber shape, a film shape (sheet shape), and the like. The intermediate formed body is preferably a sheet obtained from the melt-kneaded product (hereinafter also referred to as simply a "sheet"). The melt-kneading condition for obtaining the intermediate formed body will be described later.

The temperature range of performing the stretching is a temperature range of crystal relaxation temperature or more and the melting point or less of the resin.

That is, a preferred aspect of the method for producing the resin formed body is a producing method that includes a step of keeping the intermediate formed body obtained from the melt-kneaded product of the resin and the cellulose fiber at the temperature of the crystal relaxation temperature or more and the melting point or less of the resin and extending the intermediate formed body at least uniaxially. Here, the crystal relaxation temperature of the resin can be obtained from a curve (vertical axis: Tan δ, horizontal axis: temperature) obtained through the dynamic viscoelasticity measurement. Specifically, in the curve, a temperature that exceeds a glass-transition temperature and is a rise of a shoulder peak of Tan δ is defined as the crystal relaxation temperature.

The temperature range of performing the stretching is preferably {melting point—50° C.} or more and the melting point or less, more preferably {melting point—30° C.} or more and the melting point or less, further preferably {melting point—20° C.} or more and the melting point or less, further preferably {melting point—15° C.} or more and the melting point or less, and especially preferably {melting point—10° C.} or more and the melting point or less. By applying such a temperature, as described below, the orientation degree of the cellulose fiber and the crystal orientation degree of the resin can be sufficiently increased with a high stretching ratio.

By the extending step, separation between the cellulose fibers and the resin on the interface occurs, and pores are formed by further stretching, thus allowing obtaining a porous resin formed body. That is, the cellulose fiber in the resin formed body of the present invention has a function of making the resin formed body of the present invention a porous body to provide a resin formed body with a predetermined low density, in addition to a function as a reinforcing fiber in the resin formed body. In association with the stretching, the crystal of the resin (for example, α type crystal of polypropylene resin when the polypropylene resin is used as the resin) and the $I_\beta$ type crystal of the cellulose fiber can be oriented along the extending direction with high efficiency. Consequently, in the resin formed body of the present invention, an improvement effect of the interaction between the orientated cellulose fiber and resin compositely and sufficiently acts, thus allowing not only improving the specific strength but also sufficiently enhancing the mechanical property such as the elastic modulus in high temperature environment. In addition, the linear expansion coefficient of the obtained resin formed body can be significantly reduced, and the excellent dimensional stability is obtained.

Conventionally, for a composite material formed by combining a fiber-shaped filler and a resin, it has been difficult to realize a desired physical property or appearance when uniaxial stretching is performed with a high stretching ratio, for example, because the fiber-shaped filler becomes a starting point of breaking the extending resin. Through the examination by the inventors, it has been found that the above-described problem tends to be solved when the preferred stretching temperature is employed. Especially, when the preferred stretching temperature is employed in addition to employing the polypropylene resin, the stretching with the high stretching ratio (for example, five times or more), which has been conventionally difficult, is allowed, and the orientation degree of the cellulose fiber and the crystal orientation degree of the resin can be significantly increased. Consequently, the specific strength, the elastic modulus in high temperature environment, and the like can be more enhanced, and the linear expansion coefficient can be significantly decreased.

Furthermore, when the preferred stretching temperature is employed, the stretching with the high stretching ratio is allowed even when the cellulose fiber with the relatively high aspect ratio is used.

(Stretching)

The stretching temperature in the extending step is preferably a temperature of the crystal relaxation temperature or more and the melting point or less of the resin.

The stretching temperature in the extending step preferably has the melting point of the resin as the upper limit as described above. Accordingly, when the polypropylene resin is used as the resin, the upper limit value of the stretching temperature is preferably 170° C. or less, more preferably 165° C. or less, and further preferably 162° C. or less. By setting the stretching temperature to the preferred upper limit value or less, the stretching can be performed without melting of the crystal itself of the resin. Since the resin exhibits appropriate orientation relaxation, the reduction in mechanical property such as the elastic modulus is less likely to occur even in the high temperature environment while the high stretching ratio is achieved.

The stretching temperature preferably has the crystal relaxation temperature of the resin as the lower limit. For example, when the polypropylene resin is used as the resin, the lower limit value of the stretching temperature is preferably 50° C. or more, more preferably 80° C. or more, further preferably 100° C. or more, further preferably 130° C. or more, further preferably 140° C. or more, further preferably 150° C. or more, and especially preferably 155° C. or more. By setting the stretching temperature to the preferred lower limit value or more, the desired stretching ratio can be achieved, and the resin formed product that is excellent in tensile strength, elastic modulus in high temperature environment, and the like and has the low linear expansion coefficient can be obtained. Especially, the stretching at the temperature less than the crystal relaxation temperature of the resin (for example, less than 50° C. in the case of the polypropylene resin) possibly causes brittle breaking of the resin in some cases.

When the polypropylene resin is used as the resin, from the aspect of increasing both the orientation degree of the cellulose fiber and the crystal orientation degree of the polypropylene resin, the stretching temperature is preferably 100° C. or more and 165° C. or less, more preferably 130° C. or more and 162° C. or less, further preferably 140° C. or more and 162° C. or less, further preferably 150° C. or more and 162° C. or less, and further preferably 155° C. or more and 162° C. or less.

The stretching rate can be appropriately set depending on the types of the resin and the cellulose fiber, the shape of the intermediate formed body, the stretching temperature, and the like. For example, the stretching rate when the polypropylene resin is used as the resin and formed into a sheet shape can be set to 0.4 to 200 mm/min.

The apparatus used for the stretching is not specifically limited insofar as the intermediate formed body can be extended, and for example, a stretching machine and a tensile tester can be used. From the point that the stretching is performed at the stretching temperature described above, it is preferred to use a centrifuge or tensile tester with a constant-temperature bath.

The stretching at the stretching temperature includes, for example, the stretching at the desired stretching temperature after placing the intermediate formed body in the centrifuge or tensile tester with the constant-temperature bath and preheating in the constant-temperature bath.

The stretching ratio in the stretching can be appropriately adjusted. For example, the stretching to 5 to 20 times, preferably 6 to 20 times, more preferably 11 to 15 times to the intermediate formed body before the stretching is included. The stretching ratio means an arithmetic mean of the stretching ratio calculated by the method described in detail in the Examples.

The stretching may be multi-axial stretching or uniaxial stretching insofar as the predetermined orientation degree of the cellulose fiber and/or crystal orientation degree of the resin can be achieved. From the aspect that averaging of the orientation due to the stretching in the different directions is suppressed to increase the orientation degree of the cellulose fiber and/or the crystal orientation degree of the resin, the uniaxial stretching is preferred.

After performing the stretching to the intermediate formed body, by performing a cooling to room temperature (about 25° C.), the resin formed body of the present invention is obtained.

The condition of the cooling is not specifically limited, and the cooling may be performed by any method of natural cooling, air cooling, and the like. For example, a cooling at 1 to 500° C./min is included.

The method for preparing the intermediate formed body used in the method for producing the resin formed body of the present invention is not specifically limited. For example, a method that includes a step of forming the melt-kneaded product of the resin and the cellulose fiber into a targeted shape is included.

(Melt-Kneading)

The melt-kneaded product can be prepared by an ordinary method, which is not specifically limited, insofar as a step of melt-kneading the resin and the cellulose fiber is included.

While the melt-kneading temperature in the step of melt-kneading is not specifically limited insofar as the melt-kneading temperature is a temperature of the melting point of the resin or more, for example, when the polypropylene resin is used as the resin, the melt-kneading temperature is preferably 160° C. to 230° C., and more preferably 170° C. to 210° C.

From the aspect of reducing pyrolysis of the cellulose fiber, more preferably, the upper limit value of the melt-kneading temperature is preferably 250° C. or less, more preferably 230° C. or less, and further preferably 200° C. or less.

In performing the melt-kneading step and the above-described extending step at high temperature, the melt-kneading may be performed by adding an additive such as an antioxidant in addition to the resin and the cellulose fiber, for example, for the purpose of suppressing a thermal degradation and an oxidative degradation.

The melt-kneading time is not specifically limited, and can be appropriately set.

A device used in the above-described melt-kneading is not specifically limited as long as it can perform melt-kneading at the melting point of the resin or higher temperature, and examples of the device includes, for example, a blender, a kneader, a mixing roll, a banbury mixer, a single-screw or twin-screw extruder, and the like, but the twin-screw extruder is preferred.

From the aspect of handleability in a subsequent forming step, the obtained melt-kneaded product is preferably processed into a pellet form (hereinafter, the obtained pellet is also simply referred to as a "pellet"). The conditions for pellet processing are not specifically limited, but it can be processed according to a usual method. For example, a method in which, after water cooling the melt-kneaded product, the melt-kneaded product is processed into a pellet form using a strand cutter or the like is included as an example.

Note that, before the melt-kneading, each of the components may be dry-blended (mixed in advance). Dry-blending is not specifically limited, and can be performed according to a usual method.

(Forming)

While the method for forming the melt-kneaded product to obtain the intermediate formed body is not specifically limited, for example, a method of melt compression molding of the pellet and a method of injection molding of the melt-kneaded product are included. Among them, the method of the melt compression molding of the pellet is preferred.

In the melt compression molding, the melt compression temperature is not specifically limited insofar as the temperature is the melting point of the resin or higher temperature, and when the polypropylene resin is used as the resin, the melt compression temperature is preferably 160° C. to 230° C., and more preferably 170° C. to 210° C.

From the aspect of reducing the pyrolysis of the cellulose fiber, more preferably, the upper limit value of the melt compression temperature is preferably 250° C. or less, more preferably 230° C. or less, and further preferably 200° C. or less.

The condition such as a preheating time, a pressurization time, and a pressure in the melt compression molding can be appropriately adjusted.

The apparatus used in the melt compression molding is not specifically limited, and for example, a pressing machine is included. In addition, for example, a sheeting apparatus using an extruder for sheet molding may be used.

While the shape of the sheet is not specifically limited, for example, the sheet can be processed in a dumbbell shape. The width, the length, the thickness, and the like can be appropriately adjusted such that the stretching is easily performed. For example, the thickness of the sheet is preferably 2 mm or less, and more preferably 1 mm or less.

{Applications}

The resin formed body of the present invention can be appropriately used as materials of products, components and/or members, and the like below which require the property excellent in specific strength and elastic modulus in high temperature environment. For example, transport equipment (automobile, motorcycle, train, aircraft, and the like), a structural member of a robot arm, a component of an amusement robot, a member of an artificial limb, a material of a home appliance, a housing of OA equipment, information processing equipment, a mobile terminal, a building material, a film for plastic greenhouse, drainage equipment, a material of a toiletry product, various kinds of tanks, a container, a sheet, a packing material, a toy, and sport goods, are included.

The material for the transport equipment includes a vehicle material. The vehicle material includes, for example, interior components, such as trims, such as a dashboard trim, a door trim, and a pillar trim, a meter panel, a meter housing, a glove compartment, a package tray, a roof head lining, a console, an instrumental panel, an arm rest, a seat, a seat back, a trunk lid, a trunk lid lower, a door inner panel, a pillar, a spare tire cover, a door knob, a light housing, and a back tray; exterior components, such as a bumper, a hood, a spoiler, a radiator grille, a fender, a fender liner, a rocker panel, a side step, a door outer panel, a side door, a back door, a roof, a roof carrier, a wheel cap cover, a side-view mirror cover, and an undercover; other components, such as a battery case, an engine cover, a fuel tank, an oil filler box, an air intake duct, an air cleaner housing, an air conditioner housing, a coolant reservoir tank, a radiator reservoir tank, an window washer tank, an intake manifold, a rotating member, such as a fan and a pulley; a component, such as a wire harness protector; a connection box or a connector, and an integrally molded component, such as a front end module and a front end panel.

EXAMPLES

The present invention will be described in more detail based on examples given below, but the invention is not meant to be limited by these.

In the examples and comparative examples below, "parts" means "mass parts" unless otherwise stated.

In the following examples, the polypropylene resin which has not been modified with an acid is simply referred to as the "polypropylene resin" for convenience, and is distinguished from the acid modified polypropylene resin.

—Used Materials—

The following shows the used materials.

(Cellulose Fiber)

ARBOCEL B400: product name, manufactured by RETTENMAIER, caustic soda treated product aspect ratio (L/D): 45

(Polypropylene Resin)

Prime Polypro J106MG: product name, manufactured by Prime Polymer Co., Ltd.

crystal relaxation temperature: 70° C., melting point 165° C.

(Acid Modified Polypropylene Resin)

RIKEAID MG250P: product name, maleic anhydride modified polypropylene, manufactured by RIKEN VITAMIN CO., LTD.

RIKEAID MG400P: product name, maleic anhydride modified polypropylene, manufactured by RIKEN VITAMIN CO., LTD.

Example 1

The cellulose fiber of 20 mass parts was added to the polypropylene resin of 80 mass parts, and subjected to a 15 mm twin-screw extruder (manufactured by TECHNOVEL CORPORATION) after dry blending. After melt-kneading, the resin discharged from extrusion dies was processed into a pellet using a strand cutter after water cooling.

The obtained pellet was sufficiently dried, and subsequently, subjected to a pressing machine (product name: MP-WCH, manufactured by Toyo Seiki Seisaku-sho, Ltd.) set to 190° C., thus obtaining a polypropylene resin sheet (hereinafter referred to as a "press sheet") of 120 mm×120 mm×1 mm as the intermediate formed body under the conditions of the preheating time: 5 minutes, the pressurization time: 5 minutes, and the pressure: 20 MPa.

The press sheet was punched using a test piece punching blade (standard compliant to JIS K6251) having a shape of JIS No. 1 dumbbell, thus producing a dumbbell test piece.

The obtained dumbbell test piece was extended under the conditions below using an autograph precision universal testing machine (manufactured by Shimadzu Corporation) that includes a constant-temperature bath (product name: TCR2A-200T+125-XSP, manufactured by Shimadzu Corporation) set to 160° C.

(Conditions)

preheating time of dumbbell test piece in constant-temperature bath at 160° C.: 5 minutes
stretching rate: 50 mm/min
length between chucks: 40 mm After the stretching with the stretching ratio illustrated in Table 1, the extended dumbbell test piece was removed from the portion clamped by a tensile test jig, and the not extended portion that was clamped was removed using scissors to extract only the extended portion, thus obtaining a porous cellulose fiber-reinforced polypropylene resin formed body having the thickness of 0.4 to 0.6 mm.

Gauge points were marked on the dumbbell test piece before the stretching along the extending direction at intervals of 5 mm with an oil-based pen, a gauge length after the stretching was measured by a caliper, and the gauge length was divided by κ mm, thus obtaining the stretching ratios of the respective gauge lengths between before and after the stretching. The "stretching ratio" in Table 1 below means the arithmetic mean of the stretching ratios of the respective gauge lengths on the test piece. The stretching ratio is a stretching ratio of the whole of the test piece obtained considering the variation of the stretching ratio depending on the position in the test piece.

Example 2

A porous cellulose fiber-reinforced polypropylene resin formed body having the thickness of 0.4 to 0.6 mm was obtained in the same manner as Example 1 except that the combined amount of the polypropylene resin of Example 1 was changed from 80 mass parts to 75 mass parts, RIKEAID MG250P of 5 mass parts was additionally combined, and the test piece was extended with the stretching ratio illustrated in Table 1.

Example 3

A porous cellulose fiber-reinforced polypropylene resin formed body having the thickness of 0.4 to 0.6 mm was obtained in the same manner as Example 1 except that the combined amount of the polypropylene resin of Example 1 was changed from 80 mass parts to 75 mass parts, RIKEAID MG400P of 5 mass parts was additionally combined, and the test piece was extended with the stretching ratio illustrated in Table 1.

Example 4

A porous cellulose fiber-reinforced polypropylene resin formed body having the thickness of 0.4 to 0.6 mm was obtained in the same manner as Example 1 except that the combined amount of the polypropylene resin of Example 1 was changed from 80 mass parts to 77 mass parts, RIKEAID MG400P of 3 mass parts was additionally combined, and the test piece was extended with the stretching ratio illustrated in Table 1.

Example 5

A porous cellulose fiber-reinforced polypropylene resin formed body having the thickness of 0.5 to 0.7 mm was obtained in the same manner as Example 1 except that the temperature of the constant-temperature bath was set to 100° C. in Example 1 and the test piece was extended with the stretching ratio illustrated in Table 1.

Reference Example 1

A polypropylene resin formed body having the thickness of 0.4 to 0.6 mm was obtained in the same manner as Example 1 except that the combined amount of the polypropylene resin of Example 1 was changed from 80 mass parts to 100 mass parts, the cellulose fiber was not added, and the test piece was extended with the stretching ratio illustrated in Table 1.

Reference Example 2

The press sheet before the stretching in Reference Example 1 was obtained as a polypropylene resin formed body of Reference Example 2. In the evaluations below, dumbbell test pieces obtained by punching this resin formed body by the JIS No. 1 dumbbell was used.

Comparative Example 1

The press sheet before the stretching in Example 1 was obtained as a cellulose fiber-reinforced polypropylene resin formed body of Comparative Example 1. In the evaluations below, dumbbell test pieces obtained by punching this resin formed body by the JIS No. 1 dumbbell was used.

Comparative Example 2

The press sheet before the stretching in Example 2 was obtained as a cellulose fiber-reinforced polypropylene resin formed body of Comparative Example 2. In the evaluations below, dumbbell test pieces obtained by punching this resin formed body by the JIS No. 1 dumbbell was used.

Comparative Example 3

The pellet obtained through the melt-kneading by the twin-screw extruder in Example 1 was subjected to the molding at an injected resin temperature of 190° C. and a mold temperature of 40° C. by an injection molding machine (ROBOSHOT α-S30iA (product name), manufactured by FANUC CORPORATION), thus obtaining a cellulose fiber-reinforced polypropylene resin formed body in a shape of JIS No. 5 dumbbell.

For the cellulose fiber-reinforced polypropylene resin formed bodies obtained in Examples 1 to 5 and Comparative Examples 1 to 3, and the polypropylene resin formed body obtained in Reference Examples 1 and 2, the evaluations below were performed. Table 1 illustrates the obtained results.

(Density Measurement)

Samples of length 2 mm×width 30 mm for the density measurement were cut out from the respective obtained resin formed bodies, and the densities were measured using the samples for the measurement compliant to JIS K7112 method A (underwater substitution).

(Tensile Strength Measurement)

The tensile strength was measured for each of the obtained resin formed bodies using the autograph precision universal testing machine (manufactured by Shimadzu Corporation). Tensile conditions were set to the tension speed: 50 mm/min, the measurement temperature: 25° C., and the length between chucks: 40 mm. For the resin formed bodies (Examples 1 to 5 and Reference Example 1) subjected to the stretching, the tensile strength in the extending direction in which the tensile strength exhibits the maximum value was measured. Among the resin formed bodies not subjected to the stretching, for Reference Example 2 and Comparative Examples 1 and 2, since the tensile strength does not exhibit the directionality, the tensile strength in a length direction of the resin formed body was measured. Among the resin formed bodies not subjected to the stretching, for Comparative Example 3, the tensile strength in a flow direction in the injection molding in which the tensile strength exhibits the maximum value was measured.

(Specific Strength Calculation)

The specific strength was calculated by dividing the measured tensile strength by the measured density as the formula below.

specific strength $\{MJ/kg\}$=(tensile strength $\{MPa\}$/density $\{g/cm^3\})/10^3$ (Measurement of Linear Expansion Coefficient)

For the obtained resin formed bodies, the linear expansion coefficient was measured using a thermomechanical analyzer TMA (manufactured by METTLER TOLEDO). A nitrogen atmosphere was made inside the apparatus, and temperature rise/temperature drop rate was set to 10° C./min. A temperature pattern was set to a pattern in which the temperature was decreased from 25° C. to −60° C., subsequently, the temperature was increased to 100° C., the temperature was decreased to −60° C. again after the temperature increase, and further, the temperature was increased to 160° C., thus obtaining a TMA curve in the second temperature increase process. The mean coefficient of linear expansion in the temperature range of 60° C. or more and 100° C. or less of the obtained TMA curve was obtained. For the resin formed bodies (Examples 1 to 5 and Reference Example 1) subjected to the stretching, the linear expansion coefficient in the extending direction in which the linear expansion coefficient exhibits the minimum value was measured. Among the resin formed bodies not subjected to the stretching, for Reference Example 2 and Comparative Examples 1 and 2, since the linear expansion coefficient does not exhibit the directionality, the linear expansion coefficient in the length direction of the resin formed body was measured. Among the resin formed bodies not subjected to the stretching, for Comparative Example 3, the linear expansion coefficient in the flow direction in the injection molding in which the linear expansion coefficient exhibits the minimum value was measured.

—Wide-Angle X-Ray Diffraction Measurement—

—Method for Confirming α-Crystal of Polypropylene—

The confirmation was performed by the wide-angle X-ray diffraction measurement using D8 DISCOVER (manufactured by Bruker AXS). The set resin formed body was irradiated with a CuKα ray by a pinhole collimator narrowed down to φ0.5 mm to obtain diffraction, and the obtained diffraction was detected by a two-dimensional detector VANTEC 500 (manufactured by Bruker AXS) set to a camera length of 10 cm, thus obtaining a two-dimensional diffraction image. An integral averaging process was performed to the obtained two-dimensional diffraction image in a range of the scattering vector s of 0 to 2.91 $nm^{-1}$ in an azimuthal direction of 0 to 360°, thus obtaining one-dimensional data. After a correction of subtracting air scattering according to a transmittance of the X-ray was performed to the one-dimensional data, a curve fitting was performed using a Gaussian function, thus separating diffraction components derived from polypropylene crystals and diffraction components derived from amorphous materials. When the diffraction peaks were confirmed at the positions of the scattering vectors of 1.61±0.1 $nm^{-1}$ and 1.92±0.1 $nm^{-1}$, it was determined that the α-crystal was present. This is because the diffraction peak on the polypropylene α-crystal (110) plane appears at the position of the scattering vector s of 1.61±0.1 $nm^{-1}$ and the diffraction peak on the (040) plane appears at the position of the scattering vector s of 1.92±0.1 $nm^{-1}$.

Note that each of the resin formed bodies used for measurement had been appropriately undergone cut out and the like as necessary.

In the test piece of Example 1, as illustrated in FIG. 1, the diffraction peaks were confirmed at the respective positions of the scattering vector s of 1.61±0.1 $nm^{-1}$ and 1.92±0.1 $nm^{-1}$. In the respective test pieces of Examples 2 to 5, Comparative Examples 1 and 2, and Reference Examples 1 and 2, in the same manner, the diffraction peaks were confirmed at the respective positions of the scattering vectors of 1.61±0.1 $nm^{-1}$ and 1.92±0.1 $nm^{-1}$.

—Method for Confirming Orientation Degree of Polypropylene α-Crystal—

The orientation degree was determined using data in a range of 0° to 90° in the azimuthal direction of a two-dimensional diffraction image derived from polypropylene α-crystal obtained by the above-described confirmation method for polypropylene α-crystal. The orientation function of the azimuthal direction was used for the determination of the orientation degree. The orientation degree was obtained as a mean value of the measurement results of given three points in the test piece cut out with the thickness adjusted to 0.2 to 1 mm from each resin formed body.

—Method for Confirming Presence of Cellulose Fiber—

The confirmation was performed by the wide-angle X-ray diffraction measurement using D8 DISCOVER (manufactured by Bruker AXS). The test piece set in a state where the sample stage was inclined by θ=17.3° was irradiated with a CuKα ray by a pinhole collimator narrowed down to φ1.0 mm to obtain diffraction, and the obtained diffraction was detected by a two-dimensional detector VANTEC 500 (manufactured by Bruker AXS) set to a camera length of 10 cm, thus obtaining a two-dimensional diffraction image. An integral averaging process was performed to the obtained two-dimensional diffraction image in a range of the scattering vector s of 1.13 to 4.44 $nm^{-1}$ in an azimuthal direction of 0 to 90°, thus obtaining one-dimensional data. After a correction of subtracting air scattering according to a transmittance of the X-ray was performed to the one-dimensional data, a curve fitting was performed using a Gaussian function, thus separating diffraction components derived from polypropylene crystals and diffraction components derived from the cellulose fiber. When the diffraction peak was observed at the position of the scattering vector s of 3.86±0.1 $nm^{-1}$, it was determined that the cellulose fiber was present in the formed body. This is because the diffraction peak derived from the cellulose fiber (004) plane ordinarily appears at the position where the scattering vector s is 3.86±0.1 $nm^{-1}$.

Figure 2:
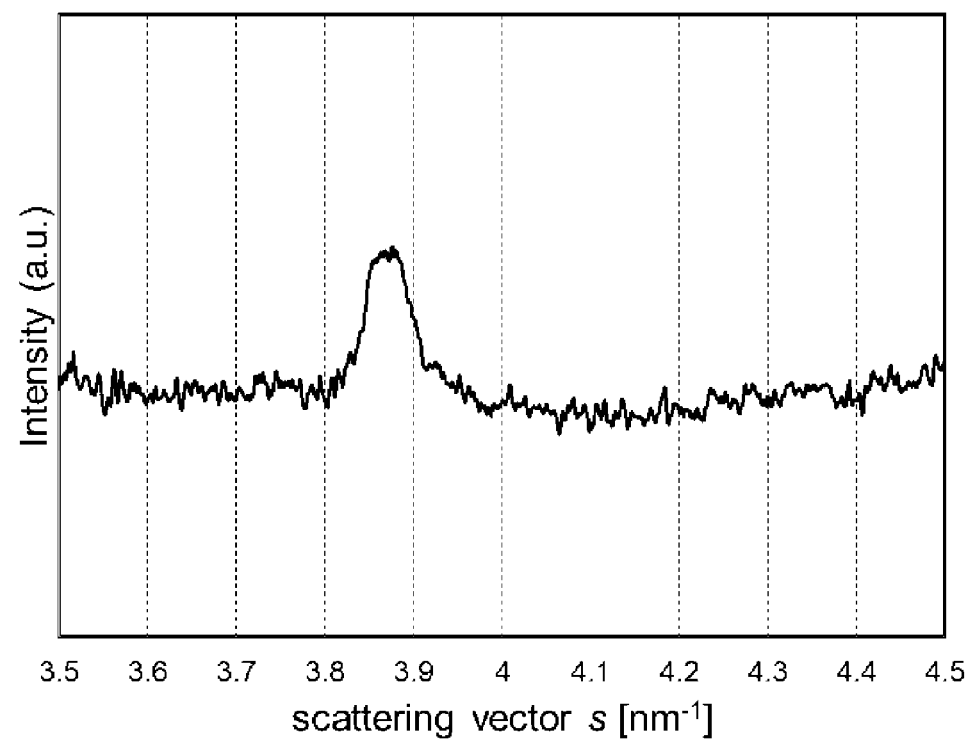
FIG. 2 is a one-dimensional diffraction pattern of a wide-angle X-ray diffraction measurement of the cellulose fiber-reinforced polypropylene resin formed body according to Example 1. A diffraction peak observed at a position of the scattering vector s of 3.87 nm$^{-1}$ is a diffraction peak derived from a cellulose fiber (004) plane.

In the test piece of Example 1, as illustrated in FIG. 2, the diffraction peak was confirmed at the position of the scattering vector s of $3.86\pm0.1$ nm$^{-1}$. In the respective test pieces of Examples 2 to 5 and Comparative Examples 1 to 3, in the same manner, the diffraction peak was confirmed at the position of the scattering vectors of $3.86\pm0.1$ nm$^{-1}$. In the respective test pieces of Reference Examples 1 and 2, the diffraction peak was not seen at the position of the scattering vectors of $3.86\pm0.1$ nm$^{-1}$.

—Method for Confirming Orientation Degree of Cellulose Fiber—

The orientation degree was determined using the data in a range of the azimuthal direction of 0 to 90° of the two-dimensional diffraction image derived from the cellulose fiber and obtained by the above-described method for confirming the presence of the cellulose fiber. An orientation function of the azimuthal direction was used for determining the orientation degree. A correction was performed using data of $33.6°\pm0.5°$ and $35.6°\pm0.5°$ close to the diffraction peak position of the cellulose as a base line of the diffraction. The orientation degree was obtained as an average value of results of the measurement at any given three points of a test piece that was adjusted to have the thickness of 0.5 to 1.5 mm and cut out from the dumbbell test piece.

(Measurement of Storage Elastic Modulus and Calculation of Elastic Modulus Retention Ratio)

Test pieces for elastic modulus measurement of the width of about 2 mm, the thickness of about 0.5 mm, and the length of 40 mm were cut out from the obtained resin formed bodies having the extending direction as the longitudinal direction, and subjected to a dynamic viscoelasticity test. The dynamic viscoelasticity test was performed to be compliant to JIS K7244 under the conditions below using RSA-G2 (product name, manufactured by TA Instruments) as a measurement apparatus.

(Conditions)
measurement temperature range: −90° C. to 150° C.
temperature rise rate: 5° C./min
measurement frequency: 1 Hz
length between chucks: 20 mm
strain: 0.05%

For the resin formed bodies subjected to the stretching (Examples 1 to 5 and Reference Example 1), the storage elastic modulus in the extending direction was measured. Among the resin formed bodies not subjected to the stretching, for Reference Example 2 and Comparative Examples 1 and 2, the storage elastic modulus in the length direction of the test piece was measured. Among the resin formed bodies not subjected to the stretching, for Comparative Example 3, the storage elastic modulus in the flow direction in the injection molding was measured.

The storage elastic modulus $E_{25}$ at 25° C. and the storage elastic modulus $E_{100}$ at 100° C. were read from a curve (graph of the vertical axis: storage elastic modulus to the horizontal axis: measurement temperature) obtained from the test.

The elastic modulus retention ratio ($E_{100}/E_{25}$) was calculated by dividing $E_{100}$ by $E_{25}$.

TABLE 1

|  |  | Ex 1 | Ex 2 | Ex 3 | Ex 4 | Ex 5 |
|---|---|---|---|---|---|---|
| Polypropylene resin (mas parts) | J106MG | 80 | 75 | 75 | 77 | 80 |
| Acid modified polypropylene resin (mas parts) | RIKEAID MG250P | — | 5 | — | — | — |
|  | RIKEAID MG400P | — | — | 5 | 3 | — |
| Cellulose fiber (mas parts) | ARBOCEL B400 | 20 | 20 | 20 | 20 | 20 |
| Stretching ratio |  | 11.4 | 9.2 | 11.8 | 8.8 | 6 |
| Density (g/cm$^3$) |  | 0.45 | 0.60 | 0.58 | 0.62 | 0.60 |
| Orientation degree of cellulose fiber |  | 0.52 | 0.81 | 0.83 | 0.64 | 0.42 |
| Crystal orientation degree of resin |  | 0.95 | 0.97 | 0.95 | 0.94 | 0.65 |
| Tensile strength (MPa) |  | 75.9 | 108.6 | 162.5 | 127.2 | 55.5 |
| Specific strength (MJ/kg) |  | 0.18 | 0.18 | 0.26 | 0.21 | 0.093 |
| Linear expansion coefficient in the temperature range of 60° C. or more and 100° C. or less (ppm/K) |  | 1 | 0 | 0 | 0 | 1 |
| Storage elastic modulus $E_{25}$ (GPa) |  | 2.9 | 4.62 | 4.75 | 4.96 | 2.51 |
| Storage elastic modulus $E_{100}$ (GPa) |  | 1.35 | 2.55 | 2.73 | 2.52 | 0.98 |
| Elastic modulus retention ratio ($E_{100}/E_{25}$) |  | 0.46 | 0.55 | 0.57 | 0.51 | 0.39 |

|  |  | REx 1 | REx 2 | CEx 1 | CEx 2 | CEx 3 |
|---|---|---|---|---|---|---|
| Polypropylene resin (mas parts) | J106MG | 100 | 100 | 80 | 75 | 80 |
| Acid modified polypropylene resin (mas parts) | RIKEAID MG250P | — | — | — | 5 | — |
|  | RIKEAID MG400P | — | — | — | — | — |
| Cellulose fiber (mas parts) | ARBOCEL B400 | — | — | 20 | 20 | 20 |
| Stretching ratio |  | 10.8 | 1 | 1 | 1 | 1 |
| Density (g/cm$^3$) |  | 0.90 | 0.90 | 1.03 | 1.03 | 1.03 |
| Orientation degree of cellulose fiber |  | — | — | 0.26 | 0.34 | 0.30 |

TABLE 1-continued

| | | | | | |
|---|---|---|---|---|---|
| Crystal orientation degree of resin | 0.96 | 0.10 | 0.12 | 0.20 | 0.40 |
| Tensile strength (MPa) | 108.3 | 39 | 38.6 | 41.6 | 36.5 |
| Specific strength (MJ/kg) | 0.12 | 0.045 | 0.035 | 0.044 | 0.035 |
| Linear expansion coefficient in the temperature range of 60° C. or more and 100° C. or less (ppm/ K ) | 1 | 142 | 80 | 81 | 81 |
| Storage elastic modulus $E_{25}$ (GPa) | 7.44 | 2.24 | 2.36 | 2.71 | 2.37 |
| Storage elastic modulus $E_{100}$ (GPa) | 2.89 | 0.6 | 0.73 | 0.85 | 0.72 |
| Elastic modulus retention ratio ($E_{100}/E_{25}$) | 0.39 | 0.27 | 0.31 | 0.31 | 0.17 |

Note:
"Ex" means Example.

Note:
"REx" means Reference example, and "CEx." means Comparative example

The result in Table 1 shows the followings.

The cellulose fiber-reinforced polypropylene resin formed bodies of Comparative Examples 1 to 3 each have the density of 1.03 g/cm³, which does not satisfy the specification of the present invention. Both the cellulose fiber-reinforced polypropylene resin formed bodies of Comparative Examples 1 and 2 were low in specific strength and elastic modulus retention ratio, and poor.

In contrast, the cellulose fiber-reinforced polypropylene resin formed bodies of Examples 1 to 5 have the diffraction peaks at the positions of the scattering vectors of 1.61±0.1 nm⁻¹, 1.92±0.1 nm⁻¹, and 3.86±0.1 nm⁻¹, and the densities are 0.65 g/cm³ or less. The cellulose fiber-reinforced polypropylene resin formed bodies of Examples 1 to 5 were excellent in specific strength and elastic modulus retention ratio. Furthermore, the linear expansion coefficients were also suppressed to less than 10 ppm/K. Especially, the cellulose fiber-reinforced polypropylene resin formed bodies of Examples 1 to 4 exhibiting the high values of 0.50 or more of the orientation degree of the cellulose crystal that had the diffraction peak at the position of 3.86±0.1 nm⁻¹ each had the high specific strength of 0.16 MJ/kg or more, and were excellent in specific strength. The cellulose fiber-reinforced polypropylene resin formed bodies of Examples 1 to 4 each had the high elastic modulus retention ratio of 0.40 or more, and were excellent in suppressing the reduction of the mechanical property in the high temperature environment. Moreover, the specific strengths and the elastic modulus retention ratios of the cellulose fiber-reinforced polypropylene resin formed bodies of Examples 1 to 4 were high compared with those of the polypropylene resin formed bodies of Reference Examples 1 and 2 that did not contain the cellulose fiber, and were excellent.

Having described our invention as related to the embodiments and the examples, it is our intention that the invention not be limited by any of the details of the description, unless otherwise specified, but rather be construed broadly within its spirit and scope as set out in the accompanying claims.

This application claims priority on Patent Application No. 2019-060606 filed in Japan on Mar. 27, 2019, which is entirely herein incorporated by reference.

The invention claimed is:

1. An organic fiber-reinforced resin formed body that contains a resin and a cellulose fiber, wherein the resin formed body has a density of 0.65 g/cm³ or less, and the resin formed body does not contain a nucleating agent; and wherein the resin has a crystal orientation degree of more than 0.50 and 1.00 or less.

2. The organic fiber-reinforced resin formed body according to claim 1, wherein the cellulose fiber has an orientation degree of 0.40 or more.

3. The organic fiber-reinforced resin formed body according to claim 1, wherein a linear expansion coefficient in a temperature range of 60° C. or more and 100° C. or less of the resin formed body is 0 ppm/K or more and less than 10 ppm/K.

4. The organic fiber-reinforced resin formed body according to claim 1, wherein the resin contains a polypropylene resin.

5. The organic fiber-reinforced resin formed body according to claim 4, wherein the polypropylene resin includes α-crystal as a main crystalline structure.

6. The organic fiber-reinforced resin formed body according to claim 4, wherein the polypropylene resin further contains an acid modified polypropylene resin.

7. The organic fiber-reinforced resin formed body according to claim 1, wherein a specific strength obtained by dividing a tensile strength of the resin formed body by the density of the resin formed body is 0.08 MJ/kg or more.

8. The organic fiber-reinforced resin formed body according to claim 1, wherein an elastic modulus retention ratio $E_{100}/E_{25}$, which is a ratio of a storage elastic modulus $E_{100}$ at 100° C. to a storage elastic modulus $E_{25}$ at 25° C., is 0.38 or more.

9. The organic fiber-reinforced resin formed body according to claim 1, wherein the resin formed body is formed by extending in one direction.

10. The organic fiber-reinforced resin formed body according to claim 1, wherein the density is 0.40 g/cm³ or more, the orientation degree of the cellulose fiber is 0.40 or more, and the crystal orientation degree of the resin is 0.65 or more and 1.00 or less.

11. A method for producing the organic fiber-reinforced resin formed body according to claim 1, having a step of maintaining an intermediate formed body obtained from a melt-kneaded product of a resin and a cellulose fiber, at a temperature of a crystal relaxation temperature or more and a melting point or less of the resin and at least uniaxially extending the intermediate formed body.

12. The organic fiber-reinforced resin formed body according to claim 1, wherein the cellulose fiber has a diameter of 5 to 30 µm.

13. An organic fiber-reinforced resin formed body that contains a resin and a cellulose fiber, wherein the resin formed body has a density of 0.65 g/cm³ or less, the resin formed body does not contain a nucleating agent, and the resin has a crystal orientation degree of more than 0.50 and 1.00 or less; and wherein the organic fiber-reinforced resin formed body is produced by a method having a step of maintaining an intermediate formed body obtained from a melt-kneaded product of the resin and the cellulose fiber, at a temperature of a crystal relaxation temperature or more and a melting point or less of the resin and at least uniaxially extending the intermediate formed body.

* * * * *